(12) United States Patent
Thursby et al.

(10) Patent No.: US 11,174,719 B2
(45) Date of Patent: Nov. 16, 2021

(54) INSPECTION ASSEMBLY LIGHTING SYSTEM

(71) Applicant: E.V. OFFSHORE LIMITED, Norwich (GB)

(72) Inventors: Jonathan Thursby, Norwich (GB); Shaun Peck, Oulton Broad (GB); Jonathan Brian Rudd, Norwich (GB)

(73) Assignee: E.V. OFFSHORE LIMITED, Norwich (GB)

( * ) Notice: Subject to any disclaimer, the term of this patent is extended or adjusted under 35 U.S.C. 154(b) by 0 days.

(21) Appl. No.: 16/479,074

(22) PCT Filed: Jan. 19, 2018

(86) PCT No.: PCT/GB2018/050164
§ 371 (c)(1),
(2) Date: Jul. 18, 2019

(87) PCT Pub. No.: WO2018/134615
PCT Pub. Date: Jul. 26, 2018

(65) Prior Publication Data
US 2019/0383129 A1 Dec. 19, 2019

(30) Foreign Application Priority Data

Jan. 20, 2017 (GB) .................................... 1701002
Nov. 10, 2017 (GB) .................................... 1718632

(51) Int. Cl.
*E21B 47/00* (2012.01)
*H04N 5/225* (2006.01)
(Continued)

(52) U.S. Cl.
CPC .......... *E21B 47/002* (2020.05); *G03B 37/005* (2013.01); *H04N 5/2252* (2013.01);
(Continued)

(58) Field of Classification Search
CPC .. E21B 47/0002; H04N 5/247; H04N 5/2256; H04N 5/2253; H04N 5/2252;
(Continued)

(56) References Cited

U.S. PATENT DOCUMENTS 4,929,070 A    5/1990  Yokota et al.
5,790,185 A *  8/1998  Auzerais ............... E21B 47/002
                                                         348/84

(Continued)

FOREIGN PATENT DOCUMENTS

GB       2270099 A     3/1994
WO    2012066309 A1    5/2012

*Primary Examiner* — Alazar Tilahun
(74) *Attorney, Agent, or Firm* — Hayes Soloway PC

(57) ABSTRACT

The field of inspection assemblies and in particular to inspection assemblies that include light sources for illuminating a field of view of a camera including an elongate housing having a longitudinal axis, a camera mounted in the housing and arranged to capture an image of a region within a field of view external to the housing, a light source mounted in the housing and arranged to illuminate the field of view, and a window element mounted in the housing, the window element comprising a light transmitting material and being located such that light emitted by the light source passes through the window element before illuminating the field of view. The window element has an internal surface, closer to the light source, and an external surface, further from the light source, and the external surface comprises a concave region.

19 Claims, 2 Drawing Sheets

(51) Int. Cl.
*H04N 5/247* (2006.01)
*G03B 37/00* (2021.01)
*E21B 47/002* (2012.01)

(52) U.S. Cl.
CPC ......... *H04N 5/2253* (2013.01); *H04N 5/2256* (2013.01); *H04N 5/247* (2013.01); *H04N 2005/2255* (2013.01)

(58) Field of Classification Search
CPC .......... H04N 2005/2255; G03B 37/005; G03B 2215/0575; G03B 2215/0567; G03B 2215/0503
See application file for complete search history.

(56) References Cited

U.S. PATENT DOCUMENTS

| | | | | |
|---|---|---|---|---|
| 6,580,449 | B1* | 6/2003 | Meltzer | E21B 47/002 |
| | | | | 348/85 |
| 6,907,138 | B1* | 6/2005 | Hoffman | G01B 11/30 |
| | | | | 382/154 |
| 7,733,584 | B2* | 6/2010 | Kazakevich | G02B 23/2407 |
| | | | | 359/637 |
| 9,891,364 | B2* | 2/2018 | Tissot | G02B 6/001 |
| 2012/0211649 | A1 | 8/2012 | Hallundbaek et al. | |
| 2016/0259237 | A1* | 9/2016 | Harris | E21B 47/0002 |

* cited by examiner

INSPECTION ASSEMBLY LIGHTING SYSTEM

CROSS-REFERENCE TO RELATED APPLICATIONS AND PRIORITY

This patent application claims priority from International Patent Application No. PCT/GB2018/050164 filed Jan. 19, 2018, which claims the benefit of GB 1701002.6 filed Jan. 20, 2017, and GB 1718632.1 filed Nov. 10, 2017. Each of these patent applications are herein incorporated by reference in their entirety.

BACKGROUND

This invention relates to the field of inspection assemblies and in particular to inspection assemblies that include light sources for illuminating a field of view of a camera. This invention is also concerned with downhole inspection tools including such inspection assemblies and comprising one or more sideview cameras for visualising an interior surface of a pipe or conduit.

A number of downhole tools exist that are able to provide a 360° view of an internal surface of a pipe or conduit. These tools are generally configured in one of three ways.

In a first type of inspection tool a camera having a wide angle of view is positioned at an end or tip of the tool. The field of view of the camera comprises a region ahead of the tool and includes a view of the internal surface of the pipe or conduit at a distance from the end of the tool. One disadvantage of this configuration is that the resultant image captured by the camera is highly distorted, especially at the periphery which includes the region of interest, namely the internal surface of the pipe. In particular, optical compression increases near the edges of the image resulting in a low resolution 360° view.

A second type of inspection tool includes a single, sideview camera that is mounted to view a region of the internal surface of the pipe located radially outwardly of the inspection tool. In order to capture a 360° view, the camera must be rotated about an axis of the tool. This has a number of disadvantages. Firstly, the motor may fail while the tool is deployed downhole, thereby restricting the images that may be captured. Secondly, the 360° view is typically achieved by rotating the camera and capturing a series of images that are then processed to create the full 360° image. This is a slow process and one that can only be practically implemented over a small area. Thirdly, for inspection tools that are memory only, i.e. they have no real-time link to an operator, there is no ability to rotate the camera. This solution is, therefore, not possible to implement in inspection tools deployed on slickline cable.

A third type of inspection tool utilises a plurality of cameras located around the circumference of the tool. The camera positions and the angle of view of each of the cameras are selected such that the cameras are able to cover a full 360° view of the internal surface of the pipe or conduit. The images captured by each of the cameras are then processed and stitched together to create the full 360° view. To enable accurate stitching of the images it is important to have an even distribution of light over the full field of view of each of the cameras. This can be difficult to achieve in situations in which the internal diameter of the pipe or conduit within which the tool is located may vary significantly.

It is an object of the present invention to provide an improved downhole inspection tool including means to illuminate a field of view of a sideview camera that overcomes a disadvantage of prior art downhole inspection tools whether referred to herein or otherwise.

SUMMARY OF THE INVENTION

According to the present invention there is provided an inspection assembly for imaging the internal surface of a pipe or conduit comprising:
an elongate housing having a longitudinal axis;
a camera mounted in the housing and arranged to capture an image of a region within a field of view external to the housing;
a light source mounted in the housing and arranged to illuminate said field of view; and
a window element mounted in the housing, the element comprising a light transmitting material and being located such that light emitted by the light source passes through the window before illuminating the field of view,
wherein the window has an internal surface, closer to the light source, and an external surface, further from the light source, and wherein the external surface comprises a concave region.

The window is preferably made of sapphire. The window is preferably mounted in a side wall of the housing.

In preferred embodiments the camera is a side view camera. The camera is preferably mounted such that the centre line or optical axis of the field of view extends in a direction transverse to, and in particular substantially perpendicular to, the longitudinal axis of the housing. The camera may include an image sensor or optical sensor and a lens. The lens may be mounted in a side wall of the housing.

In particularly preferred embodiments the housing is substantially cylindrical. The camera may be positioned so as to capture images of a region located radially outward of the housing.

The light source is preferably disposed at a location spaced apart from the camera along the longitudinal axis.

The inspection assembly may include a second light source. Preferably a first light source is disposed on a first side of the camera and a second light source is disposed on a second side of the camera. A line extending between the first and second light sources may extend parallel to the longitudinal axis of the housing.

The light source or light sources may be angled such that a centre line or optical axis of a beam of light emitted by the light source is at an angle of less than 90° to the longitudinal axis of the housing. In embodiments including a first light source on a first side of the camera and a second light source on a second side of the camera, the first and second light sources are preferably angled such that the centre lines or optical axes of the beams of light emitted by the light sources are convergent.

In a preferred embodiment of a downhole inspection assembly according to the invention a plurality of light emitters are arranged in a circumferential array. In particular, a plurality of lights are disposed around a circumferential region of housing and are configured to emit light in a radially outwards direction such that an annular region surrounding the inspection assembly is illuminated.

In these embodiments the window element is preferably annular and extends around a circumference of the inspection assembly. The internal surface of the annular window element is preferably cylindrical. The external surface of the annular window element preferably has a saddle shape or comprises a surface with negative curvature.

In preferred embodiments, therefore, the window element effectively acts as a plano-concave lens.

The inspection assembly preferably also comprises a plurality of side view cameras arranged to image different but overlapping fields of view. A plurality of cameras are preferably arranged in a circumferential array. The cameras may be arranged to image an annular region surrounding the inspection assembly.

In order to provide more even illumination of the field of view of the camera or cameras the inspection assembly may comprise a first set of light emitters and a second set of light emitters, each set of light emitters being in a circumferential array and configured to illuminate an annular region around the inspection tool.

Preferably the first set of light emitters are located in a first plane on a first side of the one or more cameras and the second set of light emitters are located in a second plane on a second, opposite side of the one or more cameras. The first and second planes are preferably perpendicular to the longitudinal axis and the first and second planes are preferably spaced apart along the longitudinal axis.

The inspection assembly will preferably be a downhole inspection assembly for imaging the internal surface of a borehole or casing, but may be used to image the internal surface or other internal features of a pipe, conduit or channel within which the inspection assembly is located. When configured as a downhole inspection assembly, the inspection assembly may be connected to and deployed on electric line, slickline, or coiled tubing.

Accordingly, the invention also provides a downhole tool for imaging the internal surface of a borehole or casing comprising an inspection assembly according to the invention connected to and deployed on electric line, slickline, or coiled tubing. The downhole tool may further comprise a bore configured to allow a flow of fluid through the tool.

The invention also provides a tool string comprising a downhole tool according to the invention and at least one other downhole tool.

BRIEF DESCRIPTION OF THE DRAWINGS

The invention will now be further described by way of example only and with reference to the accompanying drawings, in which.

DETAILED DESCRIPTION

Figure 1:
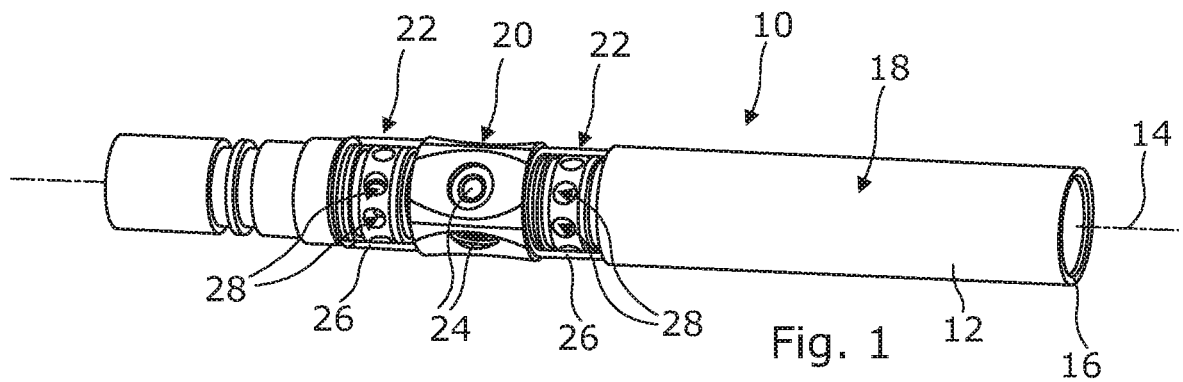
FIG. 1 is a perspective view of part of a downhole inspection tool according to an embodiment of the present invention.

FIG. 1 shows an inspection assembly or tool 10 according to a preferred embodiment of the present invention. The inspection assembly 10 comprises an elongate housing 12 having a longitudinal axis 14. The housing 12 is generally cylindrical and includes a substantially annular side wall 16. The housing side wall 16 has an outer surface 18 that defines an outer or external diameter of the inspection assembly 10.

The inspection assembly 10 further comprises a camera section 20 and two lighting sections 22 including light sources arranged to emit light to illuminate the field of view of the camera(s). The camera section 20 includes one or more cameras arranged to capture an image through one or a plurality of viewports 24 formed in the housing 12. Each lighting section 22 comprises a plurality of light sources and a light transmitting window element 26 covering the light sources.

The inspection assembly 10 will typically be used to image an internal surface of a pipe or conduit within which the inspection assembly 10 is located. In particular, the inspection assembly 10 of the present invention may be used to image an internal surface of a wellbore or casing. The wellbore or casing may have an internal diameter of between 50 mm and 255 mm. The external diameter of the inspection assembly 10, therefore, preferably does not exceed 43 mm. Furthermore, the inspection assembly 10 must be able to operate in temperatures up to 150° C. and at pressures of up to 15 kpsi (103 MPa).

When the inspection assembly 10 is used to image a wellbore or casing, the inspection assembly 10 may be deployed on slickline cable or e-line cable. If the inspection assembly is deployed on slickline cable, images captured by the one or more cameras are stored in a memory of the inspection assembly. If the inspection assembly 10 is deployed on e-line cable, images captured by the one or more cameras may be stored in a memory of the inspection assembly and/or transmitted in real-time to a receiver which will typically be located at ground level. Deploying the inspection assembly 10 on e-line cable therefore allows live images to be transmitted to a controller at a location remote from the inspection assembly and/or wellbore.

The camera or cameras of the inspection assembly 10 may capture still images and/or video images. Images may be captured at up to 25 frames per second.

In this embodiment the inspection assembly 10 includes four cameras arranged to capture an image of an internal surface of the wellbore or conduit surrounding the inspection assembly 10. The four cameras are referred to as side view cameras and are configured such that an optical axis of the field of view of each of the cameras extends substantially radially from the inspection assembly.

Each camera comprises an image sensor and at least one lens. In use, light from the field of view passes through the lens and impinges the image sensor. It will be appreciated that the image sensor may be optically aligned with the lens or, alternatively, a prism or mirror may be positioned between the lens and the image sensor such that the optical path between the lens and the image sensor is bent through an angle of, for example, about 90°.

The viewports 24 in front of each of the cameras are, preferably, spaced apart equidistantly around the circumference of the housing 12 of the inspection assembly 10. Furthermore, the angle of view or field of view of the cameras is preferably selected such that the combined images captured by the cameras cover a complete 360° circumferential view of the internal surface of the wellbore or conduit.

It is preferable if the camera lens is disposed as near to the centreline or axis of the tool as possible. In a preferred embodiment, comprising four cameras, each camera (including the image sensor and lens) is mounted on a printed circuit board (PCB) which is, in turn, mounted on a support bar or rod that extends along the axis 14 of the tool. In one embodiment the support bar has a substantially square cross-sectional shape and a PCB is mounted on each face of the bar. The support bar may be hollow and may provide a heat pipe arranged to cool the image sensors.

To minimise the cross-sectional dimension of the support bar, so that the image sensors are as close to the axis 14 of the tool as possible, each of the PCBs preferably has chamfered edges, and the chamfered edges of neighbouring PCBs are in abutting contact when mounted on the support bar. It will be appreciated that if there are fewer or more than four cameras, the support bar may have fewer or more faces on which the associated PCBs are mounted.

Each of the two lighting sections 22 includes a lighting array, and the lighting arrays are located adjacent the side view cameras to illuminate the field of view. The lighting arrays are spaced apart in a direction along the longitudinal axis 14 of the inspection assembly 10 and a first array, in a first lighting section, is located on a first side of the cameras and a second array, in a second lighting section, is located on a second side of the cameras.

Each lighting array comprises a plurality of light sources or light emitters 28 disposed around a circumference of the housing 12. Each light emitter 28 is positioned such that a centre line or optical axis of the emitted light extends radially from the housing 12. The light emitters 28 are preferably spaced apart equidistantly around the housing 12 so as to evenly illuminate an annular area around the inspection assembly 10.

The light emitters 28 are protected from the external environment of the wellbore by the window element or cover 26 made of a suitable light transmitting material. The light emitted by the light emitters 28 passes through this window element 26 before illuminating the fields of view of the cameras. In some inspection assemblies a separate, discrete window element is disposed in front of each of the light emitters 28. In a preferred inspection assembly, however, a single window element 26 extends around the full circumference of the housing 12 and covers all of the light emitters of one of the light arrays. This reduces the number of components and the number of seals that must be formed between the window element 26 and the side wall 16 of the housing 12.

In order to withstand, in particular, the high pressures within a wellbore the window element 26 is preferably made from sapphire. Each sapphire window element preferably has a thickness of at least 4 mm. Sapphire has a high tensile strength, as well as being resistant to impacts and scratching. However, sapphire has a relatively high refractive index of 1.7.

Figure 2:
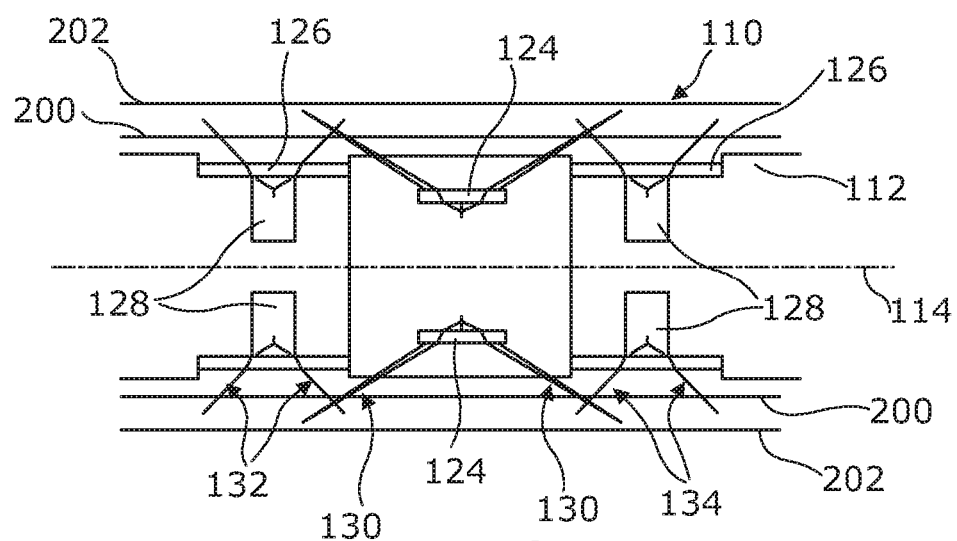
FIG. 2 is a schematic diagram illustrating a camera module of a prior art downhole inspection tool and shows, in particular, a field of view of a camera and the extent of illumination of a wall of a conduit by lighting devices positioned either side of the camera along an axis of the tool.

FIG. 2 illustrates a prior art inspection tool 110 having an arrangement of side view cameras and associated light sources 128. The cameras capture images of a field of view through a viewport 124 in the housing 112 of the inspection tool 110. The light sources 128 are disposed on either side of the viewports 124 along a longitudinal axis 114 of the inspection tool 110. The cameras are arranged to view an internal surface of a wellbore, and FIG. 2 illustrates the position of an internal surface of a smaller diameter wellbore 200 and an internal surface of a larger diameter wellbore 202 relative to the inspection tool 110. The angular extent of a field of view of each of the cameras is illustrated by a first pair of diverging lines 130, and the angular extent of the light emitted by first and second light sources 128 on either side of the camera is illustrated by two further sets of diverging lines 132, 134.

The light emitted by each of the light sources 128 passes through a window 126 in the housing 112 of the inspection assembly 110, which is traditionally made of sapphire. The resultant area of illumination on the internal surface of the wellbore is affected by both the refractive index of the sapphire of the window 126 and any wellbore fluid between an outer surface of the window 126 and the internal surface of the wellbore 200, 202. A decrease in the area of illumination, due in particular to the variations in refractive index, causes uneven illumination of the fields of view of the cameras and may lead to insufficient illumination of the field of view especially in smaller diameter wellbores.

One solution is to use higher intensity light sources disposed further from the cameras and angled such that the optical axes of the emitted light converge on the field of view of the camera. The disadvantages of this solution are the increased power required to illuminate the higher intensity light sources and the increased length of the housing required to house the camera and light sources.

Figure 3:
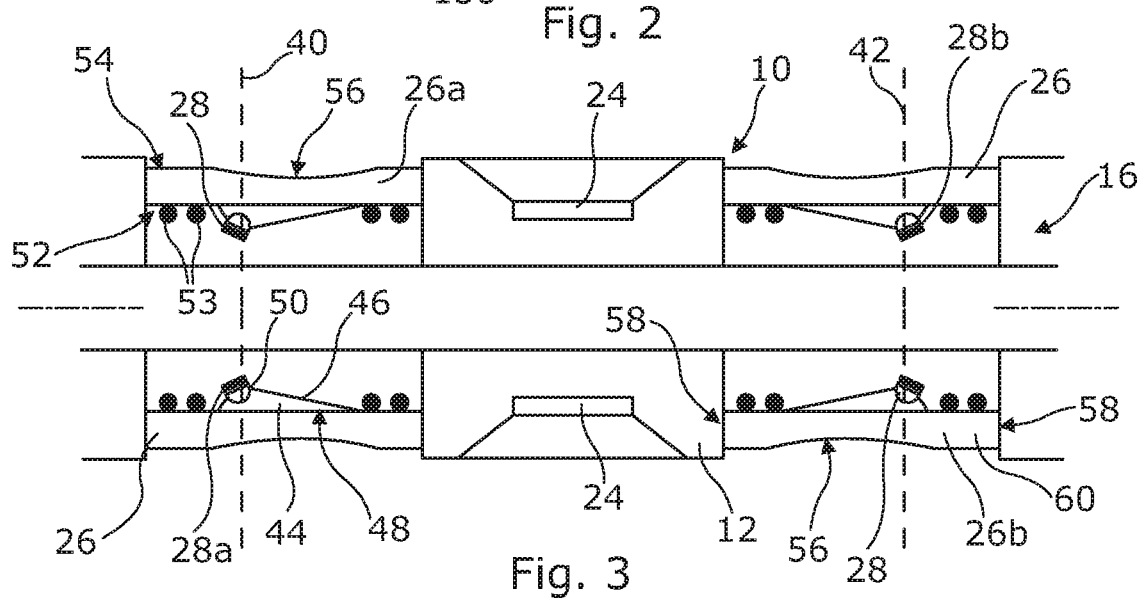
FIG. 3 is a longitudinal cross-sectional view of a part of the downhole inspection tool of FIG. 1.
Figure 4:
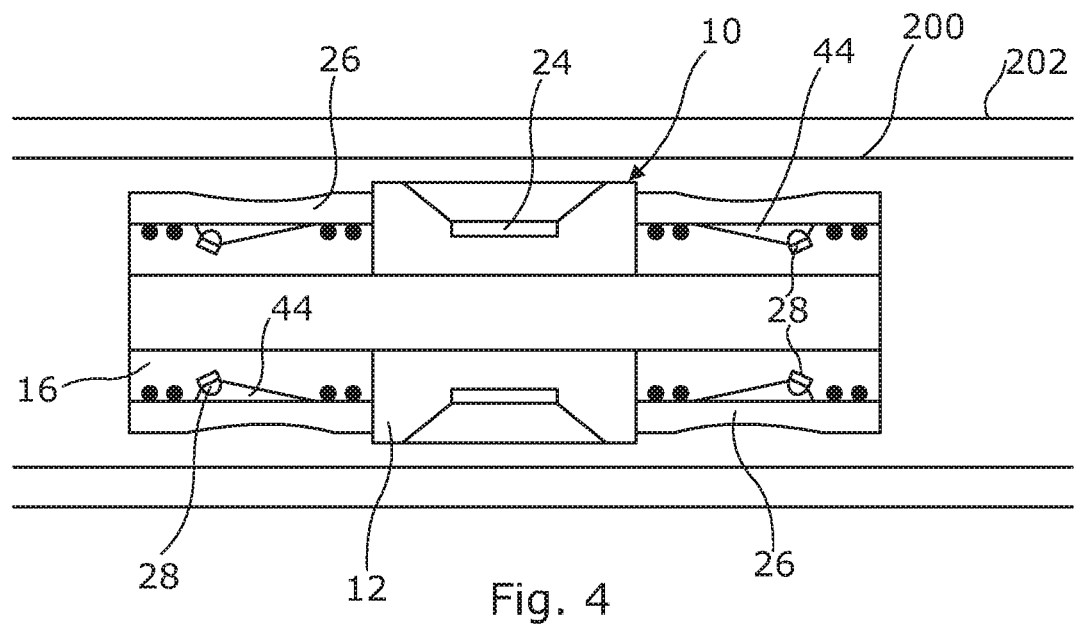
FIG. 4 shows the view of FIG. 3 with preferred dimensions of the tool.
Figure 5:
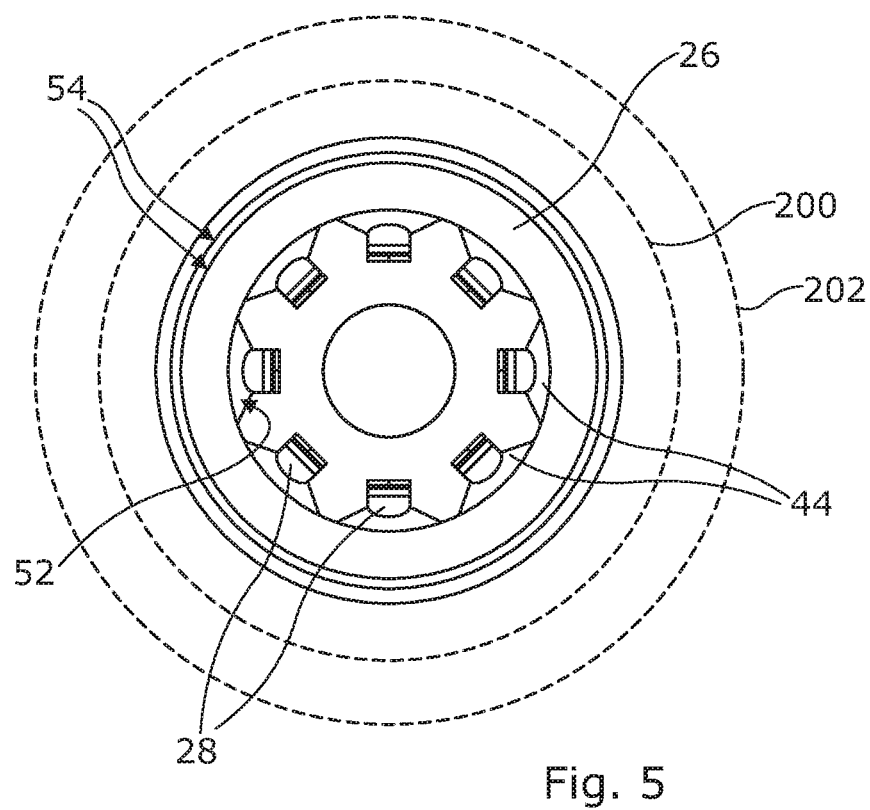
FIG. 5 is a cross-sectional view perpendicular to the longitudinal axis of the downhole inspection tool of FIG. 1 showing an array of lighting devices.

FIGS. 3 to 5 show further details of the window element 26 of the inspection assembly 10 of the present invention. As described above in relation to FIG. 1, the inspection assembly 10 includes a plurality of side view cameras. Each camera is arranged to capture an image through a viewport 24 or window in the side wall 16 of the housing 12.

A first array or set of light emitters 28a is disposed circumferentially around the housing 12 and configured to illuminate an annular region around the inspection assembly 10. A second array or set of light emitters 28b is also disposed circumferentially around the housing 12 and configured to illuminate an annular region around the inspection tool 10. The first set of light emitters 28a is located in a first plane 40 on a first side of the cameras and the second set of light emitters 28b is located in a second plane 42 on a second, opposite side of the cameras. In particular the first set of light emitters 28a is disposed between the camera viewport(s) 24 and a first end of the housing 12 and the second set of light emitters 28b is disposed between the camera viewport(s) 24 and a second end of the housing 12. The first and second planes 40, 42 are preferably substantially perpendicular to the longitudinal axis 14 and the first and second planes 40, 42 are preferably spaced apart along the longitudinal axis 14 of the inspection assembly 10.

Each of the light emitters 28 is mounted in or disposed within a recess 44 in a part of the outer surface 18 of the housing 12. Each recess 44 preferably has a substantially conical or tapered sidewall 46 such that an opening 48 in the outer surface 18 of the housing 12 has a larger diameter than a base 50 of the recess 44. In this embodiment each light emitter 28 is preferably located at the base 50 of the recess 44. In other embodiments the light emitters 28 may be mounted on or in the sidewall 46 of the recess 44.

In preferred embodiments each of the light emitters 28 is mounted in a recess 44 at an angle of less than 90° to the longitudinal axis 14 and such that a centreline or optical axis of the light emitted by the light emitter 28 extends in a direction towards the centre of the field of view of the camera. In order to maximise the intensity of light illuminating the field of view, the conical recess 44 is also angled. Preferably an angle between a part of the recess sidewall 46 closest to the camera viewport 24 and the longitudinal axis 14 of the housing 12 is smaller than an angle between a part of the recess sidewall 46 furthest from the camera viewport 24 and the longitudinal axis 14. In other words, the slope of part of the sidewall 46 of the recess 44 closer to the camera viewport 24 is shallower than the slope of part of the sidewall 46 of the recess 44 further from the camera viewport 24.

In some embodiments a single recess in the form of a circumferential channel is provided in the sidewall 16 or outer surface 18 of the housing 12. The recess preferably comprises a first sidewall extending circumferentially around the housing, a second sidewall extending circumferentially around the housing, and a base extending between the sidewalls. The light emitters 28 may be mounted in or on the base or one of the sidewalls of the channel. Preferably the light emitters are mounted on the first sidewall facing in a direction substantially towards the camera section 20 of the inspection assembly 10.

In some embodiments each set of light emitters 28a, 28b comprises a first sub-set of light emitters and a second sub-set of light emitters. A centreline or optical axis of each light emitter 28 in the first sub-set is at a first angle to the longitudinal axis 14. A centreline or optical axis of each light emitter 28 in the second sub-set is at a second angle to the longitudinal axis 14. Both the first and second angles are less than 90° and the first angle is less than the second angle. Each of the sub-sets of light emitters 28 is configured to illuminate a different diameter of pipe. Preferably, each of the sub-sets is separately controllable and is preferably separately dimmable.

A cylindrical window element 26 extends around part of the outer surface 18 of the housing 12 and covers each of the recesses 44 corresponding to light emitters 28 in one of the sets of light emitters. As such, a first window element 26a extends around the housing 12 and covers the first set of light emitters 28a and a second window element 26b extends around the housing 12 and covers the second set of light emitters 28b.

Each of the window elements 26 is made from a single piece of light transmitting material. Preferably each of the window elements 26 is made from sapphire.

Each window element 26 has a cylindrical inner surface 52 that contacts a part of the outer surface 18 of the housing 12 around the recesses 44. Suitable o-rings 53 may be located between the inner surface 52 of the window element 26 and a part of the housing 12 in order to create the required seal between the window element 26 and the housing 12. An outer surface 54 of the window element 26 forms a part of an external surface of the inspection assembly 10.

The outer or external surface 54 of the window element 26 comprises a concave region 56. The concave region 56 may be centrally located along the length or width of the window element 26 (defined between edges 58 of the window element 26) and extend fully around the annular window element 26. In this way, edge regions 60 of the outer surface 54 may be cylindrical and the concave region 56 may be in the form of a circumferentially extending concave channel.

In some embodiments the curvature of the concave region 56 may not be symmetrical between the edges 58 of the window element 26. In particular, a minimum external diameter of the window element 26 may lie on a plane that is not midway or equidistant between opposite edges 58 of the window element 26. In preferred embodiments the minimum external diameter of the window element 26 may lie on a plane closer to a first edge 58 of the window element 26 than to a second edge 58.

The window element 26 effectively acts as a plano-concave lens in front of each of the light emitters 28. In this way the light emitted by the light emitters 28 is distributed more evenly over the area of the fields of view of the cameras, even in very small pipe diameters.

One advantage of the present invention is that smaller light sources can be used to achieve the required illumination compared to prior art systems. This is particularly advantageous when the maximum external diameter of the inspection assembly or tool is limited by a specific application.

FIGS. 4 and 5 illustrate the inspection assembly 10 of the present invention within a first borehole or pipe 200 having a smaller diameter and a second borehole or pipe 202 having a larger diameter. FIG. 4 also shows typically dimensions of a preferred embodiment of the inspection assembly 10. The inspection assembly 10 preferably has a maximum external diameter of about 43 mm to allow it to view internal surfaces of boreholes or pipes having internal diameters of, for example, between 50 mm and 65 mm. The maximum external diameter may be between 30 mm and 50 mm, and is more preferably between 40 mm and 45 mm.

A maximum external diameter of the window element 26 may be 40 mm. A maximum thickness of the window element 26, i.e. a distance between the inner and outer surfaces 52, 54 may be 5.5 mm. A minimum thickness of the window element 26 may be 4 mm. The maximum thickness of the window element 26 may be proximate the edges 58 and the minimum thickness may be in a central region, and the difference between the maximum and minimum thicknesses may be due to the concavity of the outer surface 54 of the window element 26.

The arrangement of the angled light sources 28 and the plano-concave window element 26 provides even illumination of the field of view when inspecting and capturing images of the internal surface of pipes having varying internal diameters, while minimising the external diameter and required length of the inspection tool.

Furthermore, the configuration of the window elements 26 means that they are practical to manufacture and to service. The profiled cylindrical window element 26 may be easily manufactured from a single piece of sapphire. Sealing the internal surface 52 of the window element 26 against an external surface 18 of the housing 12 means that the presence of the window element 26 does not affect connections between longitudinal sections of the housing 12, and means that the housing 12 may be easily dismantled and serviced.

In some embodiments it may be desirable if an optically clear fluid is disposed between the light emitters 28 and the inner surface 52 of the window element 26. The optically clear fluid may fill the recess or recesses 44 in which the light emitters 28 are disposed. The optically clear fluid may be in the form of a liquid or a gel. In preferred embodiments the optically clear fluid is a silicone fluid or silicone gel.

The presence of a suitable fluid between the light emitters 28 and the window element 26 results in a more even spread of light emitted from the window element 26, although the intensity of the light emitted may decrease overall, leading to a more even illumination of the field of view. If the fluid behind the window element 26 is under pressure, this may result in an improved pressure rating of the window element 26. This may allow a reduction in thickness of the window element 26, thereby reducing material costs, while still being able to withstand the high pressures experienced at depth downhole. Accordingly, in some embodiments in which a pressurised fluid is disposed behind the window element 26, the window element 26 may have a minimum thickness of 2 mm or 3 mm.

The inspection assembly of the present invention may be deployed in a downhole tool having a flow through channel. In these embodiments the tool may comprise a bore extending longitudinally along the tool, the bore permitting fluids to flow through the tool. The tool may have a substantially annular or tubular main body. A plurality of side view cameras may be spaced apart around the main body to image an annular field of view around the tool.

In other embodiments the inspection assembly of the present invention may be deployed in a downhole inspection tool having means to connect the inspection tool to another downhole tool to form a tool string. The tool string may include a flowmeter such as a spinner or another camera such as a down view camera. The tool string may include another inspection assembly and/or a mechanical tool.

The present invention therefore provides an inspection assembly having improved illumination of a field of view of a camera.

The invention claimed is:

1. An inspection assembly for imaging the internal surface of a pipe or conduit comprising:
    an elongate housing having a longitudinal axis;
    a camera mounted in the housing and arranged to capture an image of a region within a field of view external to the housing;
    a light source mounted in the housing and arranged to illuminate said field of view; and
    a window element mounted in the housing, the window element comprising a light transmitting material and being located such that light emitted by the light source passes through the window element before illuminating the field of view,
    wherein the window element has an internal surface, closer to the light source, and an external surface, further from the light source, and wherein the external surface comprises a concave region, and wherein the concave region is centrally located along a length or a width of the window element.

2. An inspection assembly as claimed in claim 1, wherein the window element is made of sapphire.

3. An inspection assembly as claimed in claim 1, wherein the window element is mounted in a side wall of the housing.

4. An inspection assembly as claimed in claim 1, wherein the light source is disposed at a location spaced apart from the camera along the longitudinal axis.

5. An inspection assembly as claimed in claim 1, further comprising a second light source.

6. An inspection assembly as claimed in claim 5, wherein a first light source is disposed on a first side of the camera and the second light source is disposed on a second side of the camera.

7. An inspection assembly as claimed in claim 6, wherein a line extending between the first and second light sources extends parallel to the longitudinal axis of the housing.

8. An inspection assembly as claimed in claim 1, wherein the light source is angled such that a center line of a beam of light emitted by the light source is at an angle of less than 90° to the longitudinal axis of the housing.

9. An inspection assembly as claimed in claim 7, wherein the first and second light sources are angled such that center lines of the beams of light emitted by the light sources are convergent.

10. An inspection assembly as claimed in claim 1, wherein the light source comprises a plurality of light emitters arranged in a circumferential array.

11. An inspection assembly as claimed in claim 10, wherein the plurality of light emitters are disposed around a circumferential region of the housing and the light emitters are configured to emit light in a radially outwards direction such that an annular region surrounding the housing is illuminated.

12. An inspection assembly as claimed in claim 1, wherein the window element is annular.

13. An inspection assembly as claimed in claim 12, wherein the internal surface of the annular window element is cylindrical.

14. An inspection assembly as claimed in claim 10, further comprising a plurality of side view cameras.

15. An inspection assembly as claimed in claim 14, wherein the cameras are arranged in a circumferential array.

16. An inspection assembly as claimed in claim 14, further comprising a first circumferential array of light emitters lying in a first plane on a first side of the cameras and a second circumferential array of light emitters lying in a second plane on a second side of the cameras, the first and second planes being substantially perpendicular to the longitudinal axis and the first and second planes being spaced apart along the longitudinal axis.

17. A downhole tool for imaging the internal surface of a borehole or casing comprising an inspection assembly, wherein the inspection assembly comprises:
    an elongate housing having a longitudinal axis;
    a camera mounted in the housing and arranged to capture an image of a region within a field of view external to the housing;
    a light source mounted in the housing and arranged to illuminate said field of view; and
    a window element mounted in the housing, the window element comprising a light transmitting material and being located such that light emitted by the light source passes through the window element before illuminating the field of view,
    wherein the window element has an internal surface, closer to the light source, and an external surface, further from the light source, and wherein the external surface comprises a concave region, and the concave region is centrally located along a length or a width of the window element, and
    wherein the inspection assembly is connected to and deployed on at least one of an electric line, slickline, or coiled tubing.

18. A downhole tool as claimed in claim 17 further comprising a bore configured to allow a flow of fluid through the tool.

19. A tool string comprising:
    a downhole tool for imaging the internal surface of a borehole or casing, wherein the downhole tool comprises an inspection assembly; and
    at least one other downhole tool,
    wherein the inspection assembly comprises:
        an elongate housing having a longitudinal axis;
        a camera mounted in the housing and arranged to capture an image of a region within a field of view external to the housing;
        a light source mounted in the housing and arranged to illuminate said field of view; and
        a window element mounted in the housing, the window element comprising a light transmitting material and being located such that light emitted by the light source passes through the window element before illuminating the field of view,
        wherein the window element has an internal surface, closer to the light source, and an external surface, further from the light source, and wherein the external surface comprises a concave region and the concave region is centrally located along a length or a width of the window element, wherein the inspection assembly is connected to and deployed on at least one of an electric line, slickline and coiled tubing.

\* \* \* \* \*